United States Patent
Choi

(10) Patent No.: US 7,506,353 B2
(45) Date of Patent: Mar. 17, 2009

(54) APPARATUS AND METHOD FOR SPEED-CHANGE PLAYBACK OF DIGITAL TV

(75) Inventor: Man Sik Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 1254 days.

(21) Appl. No.: 10/338,728

(22) Filed: Jan. 9, 2003

(65) Prior Publication Data

US 2003/0163825 A1 Aug. 28, 2003

(30) Foreign Application Priority Data

Feb. 23, 2002 (KR) .................... 10-2002-0009762

(51) Int. Cl.
*H04N 7/173* (2006.01)
(52) U.S. Cl. ............................ 725/88; 725/87; 725/90; 725/93
(58) Field of Classification Search ........... 725/86–104; 386/68, 111, 121, 95, 125, 126, 46, 70, 109, 386/110
See application file for complete search history.

(56) References Cited

U.S. PATENT DOCUMENTS

| | | | | |
|---|---|---|---|---|
| 6,057,832 A | * | 5/2000 | Lev et al. | 715/720 |
| 6,848,117 B1 | * | 1/2005 | Emura | 725/87 |
| 2001/0036269 A1 | | 11/2001 | Morinaga et al. | |

* cited by examiner

*Primary Examiner*—Hunter B. Lonsberry
(74) *Attorney, Agent, or Firm*—Birch, Stewart, Kolasch & Birch, LLP

(57) ABSTRACT

Disclosed is a speed-change playback apparatus of a digital TV which performs better fast forward and backward performances by analyzing a transport stream inputted at the time of a time shift service and a method thereof. An MPEG decoder detects I picture location information in a TP packet by analyzing a TP packet inputted at the time of a time shift service, and a time shift software module extracts a TP packet constituting the I picture from the stored TP packets by the detected I picture location information and feeds to the MPEG decoder. Therefore, fast forward and fast backward performances can be efficiently performed by adding a simple logic which analyzes the TP packet to the MPEG decoder.

6 Claims, 3 Drawing Sheets

APPARATUS AND METHOD FOR SPEED-CHANGE PLAYBACK OF DIGITAL TV

BACKGROUND OF THE INVENTION

1. Field of the Invention

The present invention relates to a digital TV, and more particularly, to a speed-change playback apparatus of a digital TV which performs better fast forward and backward performances by analyzing a transport stream inputted at the time of a time shift service and a method thereof.

2. Description of the Background Art

A time shift performance which is one of additional performances of a broadcasting receiver of a digital television is used when a user wants to review a previous screen which is missed while the user quits his place for a while by a slow motion and etc.

When the time shift performance is set as an enable state by the user, the digital TV receiver records a transport stream (hereinafter, will be called as a TP packet) which is currently received at a storage unit and a scene of the enable time point is displayed on a screen of the digital TV receiver as a stop state. Then, when the user presses a play button, scenes from the stop state to the stored state in the storage unit corresponding to the TP packet are displayed on the screen, so that the user can watch consecutive scenes without stopping even if he quitted his place for a while.

At this time, the digital television receiver can operate performances such as a rewind, a forward, or a fast forward by the user. Also, the rewind, the fast rewind, the forward, and the fast forward performances are possible from a time point when the time shift performance is started to a time point of a current broadcasting. In case that a scene is displayed to the current broadcasting time point by the fast forward performance, the digital television receiver turns off the time shift performance automatically and displays the current broadcasting scene on the screen.

In the conventional digital television receiver for the time shift performance, the fast forward, the fast backward, and the backward performances are realized by feeding the TP stream stored in the storage unit to an MPEG decoder IC in a forward direction or in a backward direction.

That is, in case of the fast forward of the forward direction, the digital TV receiver feeds the TP packet stored in the storage unit to the MPEG decoder IC with a higher rate.

At this time, the digital TV receiver ignores the TP packet, that is, timestamp information of the MPEG stream, and playbacks the TP stream on the screen with a maximum operation speed of the MPEG decoder IC. Herein, the playback speed of the MPEG decoder IC is two times or four times and so on.

Generally, the TP packet includes an intra frame (hereinafter, will be called as I picture) for reducing spatial redundant information of a video signal, a predicted frame (called as P picture) which has a correlation between the frames through a forward prediction, and an interpolated frame (called as B picture) for reducing a correlation between the frames through a bi-directional prediction.

To playback the TP packet with a two or four times speed than normal, the MPEG decoder IC of the digital TV receiver normally skips the B picture and the P picture of the TP streams, and decodes only the I picture, thereby displaying on the screen.

Also, for much higher times speed, the MPEG decode IC of the digital TV receiver decodes by skipping the I picture of the TP packet. That is, the MPEG decoder IC can realize a forwarding speed of two times by decoding one of four I pictures rather than by decoding one of two I pictures.

As aforementioned, in order to perform the high times speed playback, the MPEG decoder IC has to decode only necessary parts of the I, B, and P pictures of the TP packet. However, the MPEG decoder IC has a limited bandwidth of the TP packet which is possible to parse, thereby having a limited operation to perform the fast forward times speed playback.

Also, in case of the rewind performance, a general MPEG decoder IC does not support the decoding. That is, the MPEG stream has decoding information which is almost given in a previous TP packet, so that a decoding is impossible in case that information of the previous packet does not exist.

To solve this problem, a software method is generally used. That is, the MPEG IC treats a group of picture (GOP) level which is starting with the I picture as one group, thereby recognizing a recorded TP as several groups of GOP and feeding the several groups of GOP inversely.

For this method, a software program parses from an end of the stored TP packet inversely to find a starting time point of the GOP. Then, the software program feeds the MPEG decoder inversely from a GOP adjacent to the end of the TP packet end to the starting time point of the GOP.

Since the backward or the fast backward playback by the software method playbacks after parsing the stored TP packet inversely, it is difficult to realize much higher time speeds.

SUMMARY OF THE INVENTION

Therefore, an object of the present invention is to provide a speed change playback apparatus of a digital television which adds a simple logic for extracting I picture location information in a TP packet by analyzing the TP packet in an MPEG decoder and a method thereof.

To achieve these and other advantages and in accordance with the purpose of the present invention, as embodied and broadly described herein, there is provided a speed change playback apparatus of a digital television comprising: an MPEG decoder for detecting and temporarily storing location information of an I picture in a TP packet received in the digital TV in accordance with that a time shift service request signal is inputted, and feeding a signal notifying a detection of the I picture location information and the TP packet from a starting time point of the time shift service by the time shift service request signal; an I picture location information storing unit for storing the detected I picture location information; a time shift TP stream storing unit which stores the TP packet from the starting time point of the time shift service; and a time shift software module for reading I pixel location information stored in the MPEG decoder by a signal notifying the I picture location information inputted by the MPEG decoder, thereby feeding to the I picture location information storing unit in time orders, feeding the TP packet from the starting time point of the time shift service to the time shift TP stream storing unit, and if a playback request signal is inputted by the user, extracting the TP packet constituting the I picture from the TP packets stored in the time shift stream storing unit by using the stored I picture location information and thereby feeding to the MPEG decoder.

To achieve these and other advantages and in accordance with the purpose of the present invention, as embodied and broadly described herein, there is still provided a speed change playback method of a digital television comprising the steps of: detecting the I picture location information in the TP packet inputted to the digital TV from a time shift service request time point and temporarily storing; feeding a signal notifying the I picture detection and feeding the TP packet from the time service starting time point; storing the I picture location information in time orders by the I picture detection notifying signal and storing the TP packet from the time shift service time point; and if a playback request signal is inputted by the user at the time of performing the time shift service, extracting the TP packet constituting the I picture from the stored TP packets by the stored I picture location information and decoding.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Hereinafter, the speed change playback apparatus of a digital TV according to the present invention and the method thereof will be explained with reference to the attached drawings.

Figure 1:
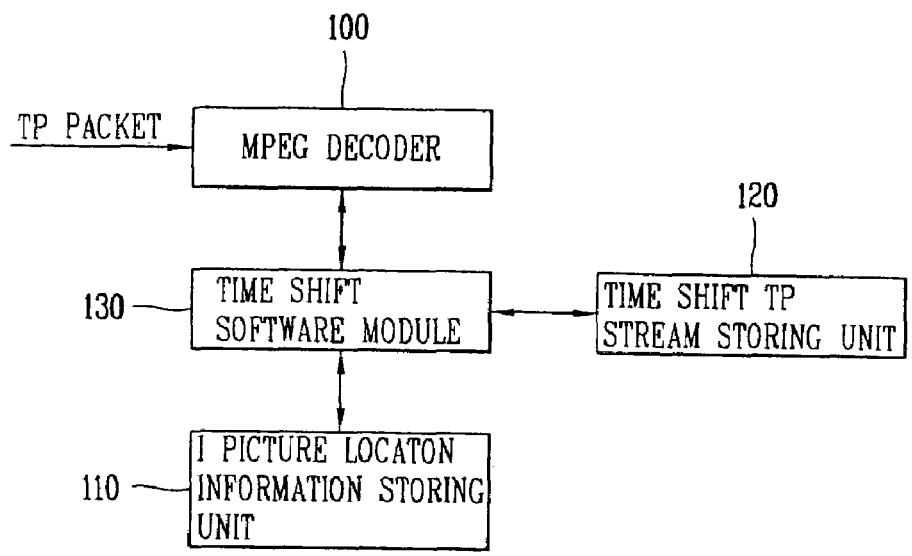
FIG. 1 is a construction block diagram showing a speed change playback apparatus of a digital TV according to the present invention.
Figure 2:
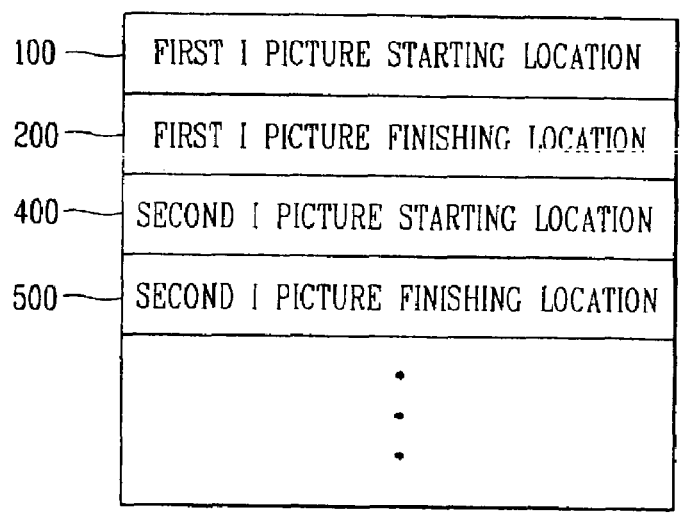
FIG. 2 is an inner construction view of an I pixel location information database.

FIG. 1 is a construction block diagram showing a speed change playback apparatus of a digital TV according to the present invention, and FIG. 2 is an inner construction view of an I pixel location information database.

As shown in FIG. 1, the speed change playback apparatus of a digital TV according to the present invention comprises: an MPEG decoder 100 for detecting and temporarily storing location information of an I picture in a TP packet inputted from a time shift service start point, and feeding the temporarily stored I picture location information and the TP packet from the time shift service start point; an I picture location information storing unit 110 for storing the I picture location information in time orders; a time shift TP stream storing unit 120 for storing the TP packet from a time point when the I picture is initially detected; and a time shift software module 130 for feeding the I picture location information and the TP packet inputted by the MPEG decoder 100 to the I picture location information storing unit 110 and the time shift TP stream storing unit 120, respectively, and if a playback request signal is inputted by the user, extracting the TP packet constituting the I picture by using the stored I picture location information and thereby feeding to the MPEG decoder 100.

Herein, the I picture location information includes the location information of TP packets which locate in the position of start and end of I picture.

Operations of the speed change playback apparatus of a digital TV according to the present invention will be explained.

When the time shift service request is inputted by the user, the MPEG decoder 100 detects the I picture in the TP packet inputted to the digital TV from the time shift service time point.

Also, the MPEG decoder 100 stores location information of the detected I picture in an inner specific location, that is, a predetermined memory or a register. Herein, the I picture location information includes a start location information and a finish location information of the I picture.

At this time, the MPEG decoder 100 stores the detected I picture location information in the inner specific location and simultaneously generates an interrupt signal for notifying the fact that the I picture location information is stored in its specific location to the time shift software module 130.

Then, the MPEG decoder 100 feeds the TP packet from the time shift service time point to the time shift software module 130 through an external interface.

The time shift software module 130 reads the I picture location information stored at the specific location of the MPEG decoder 100 when the interrupt signal is generated by the MPEG decoder 100, and records it into the I picture location information storing unit 110 in time orders.

The I picture location information storing unit 110 the I picture location information inputted from the time shift software module 130. At this time, as shown in FIG. 2, first I picture start location information, first I picture finish location information, second I picture start location information, second I picture finish location information, and etc. are stored in time orders.

Also, the time shift software module 130 stores the TP packet which is received from the MPEG decoder 100 to the time shift TP stream storing unit 120. At this time, the TP packet stored in the time shift TP stream storing unit 120 is a TP packet from the time shift service time point.

When the playback request signal is inputted from the user, the time shift software module 130 extracts the TP packet constituting the I picture from the TP packets stored in the time shift TP stream storing unit 120 by using the I picture location information stored in the I picture location information storing unit 110.

Subsequently, the time shift software module 130 feeds the extracted TP packet constituting the I picture to the MPEG decoder 100.

Herein, in case that the playback request signal inputted from the user is a forward or a fast forward request signal, the time shift software module 130 feeds the TP packet constituting the I picture to the MPEG decoder 100 in time orders by the I picture location information stored in time orders.

In the meantime, in case that the playback request signal inputted from the user is a backward or a fast backward request signal, the time shift software module 130 feeds the TP packet constituting the I picture to the MPEG decoder 100 in reversed time orders by the I picture location information stored in reversed time orders.

That will be explained with reference to FIG. 3.

Figure 3:
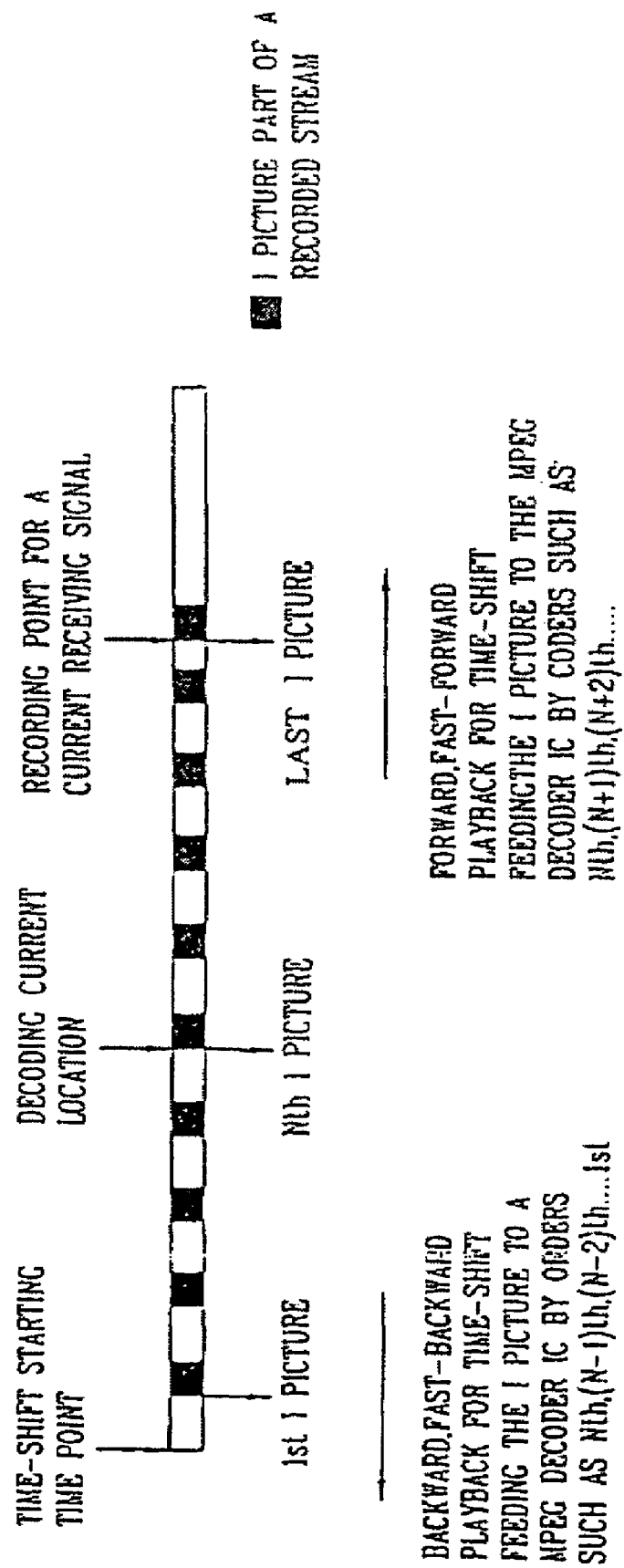
FIG. 3 is an exemplary view showing a process operation of a TP packet constituting an I picture according to the present invention.

FIG. 3 is an exemplary view showing a process operation of a TP packet constituting an I picture according to the present invention.

As shown in FIG. 3, in case that the forward or the fast forward request signal are inputted, the time shift software module 130 feeds the TP packet constituting the I picture to the MPEG decoder 100 of the TP packets stored in the time shift TP stream storing unit 120 by orders such as Nth, (N+1) th, (N+2)th, . . . .

Herein, the Nth I picture is an I picture of an order that the MPEG decoder 100 is currently decoding.

In the meantime, in case that the backward or the fast backward request signal are inputted, the time shift software module 130 feeds the TP packet constituting the I picture to the MPEG decoder 100 by orders such as Nth, (N−1)th, (N−2)th, . . . , 1$^{st}$.

The MPEG decoder 100 decodes the TP packet constituting the I picture fed by the time shift software module 130.

The speed change playback method of the digital TV according to the present invention will be explained with reference to the attached drawings.

Figure 4:
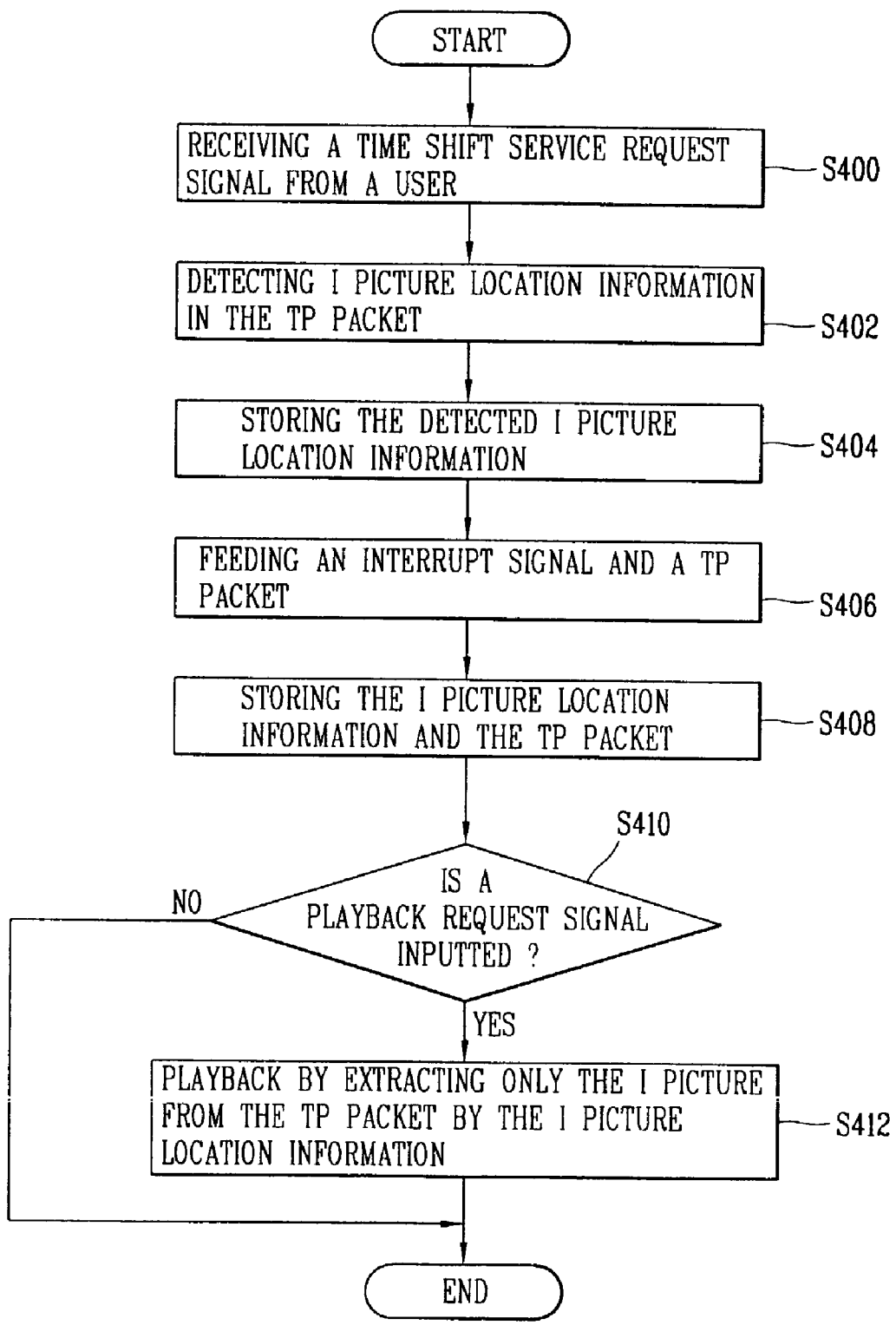
FIG. 4 is a flow chart for performing a speed change playback of a digital TV according to the present invention.

FIG. 4 is a flow chart for performing a speed change playback of a digital TV according to the present invention.

First, when the time shift service request signal is inputted by the user S400, the MPEG decoder 100 detects the I picture location information in the TP packet inputted from the time shift service request time point S402.

Herein, the I picture location information includes a start location information and a finish location information of the I picture.

Subsequently, the MPEG decoder 100 temporarily stores the detected I picture location information at the inner register or at the inner memory S404, and generates the interrupt signal for notifying that the I picture location information is detected and the TP packet from the time shift service time point to the time shift software module 130 S406.

The time shift software module 130 reads the I picture location information stored in the MPEG decoder 100 when the interrupt signal is generated by the MPEG decoder 100, and stores the read I picture location information to the I picture location information storing unit 110 in time orders S408.

Also, the time shift software module 130 stores the TP packet inputted from the MPEG decoder 100 to the time shift TP stream storing unit 120 S408.

Herein, the step 402 or 408 are repeatedly performed at the time of the time shift service.

Then, the time shift software module 130 determines whether the playback request signal is inputted from the user S410 or not. If it is determined that the playback request signal is inputted, the time shift software module extracts the TP packet constituting the I packet from the TP packets stored in the time shift TP stream storing unit 120 by the I picture location information stored in the I picture location information storing unit 110, and feeds to the MPEG decoder 100 S412.

Herein, in case that the playback request signal inputted from the user is the forward or the fast forward, the time shift software module 130 feeds the TP packet constituting the I picture to the MPEG decoder 100 in time orders by the I picture location information stored in time orders.

In the meantime, in case that the playback request signal inputted from the user is the backward or the fast backward, the time shift software module 130 feeds the TP packet constituting the I picture to the MPEG decoder 100 in reversed time orders by the I picture location information stored in reversed time orders.

As aforementioned, in the present invention, the I picture location information is detected by analyzing the inputted TP packet by the MPEG decoder, and the TP packet constituting the I picture can be extracted from the TP packets stored for the time shift service by the detected I picture location information and decoded.

Therefore, in the present invention, by adding a simple logic which analyzes the TP packet, that is, which detects the I picture location information at the MPEG decoder, the fast forward, the backward, and the fast backward playback of a better performance can be performed.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A speed change playback apparatus of a digital television, comprising:
    an MPEG decoder configured to
        receive and record a stream of traffic;
        decode the recorded stream of traffic at a position different from a recording position;
        receive a time shift service request including a lime shift service request time point,
        as a result of receiving the time shift service request, detect and store location information of an I picture of a transport stream packet (TP packet), the location information corresponding to the time shift service request time point,
        output a signal notifying a detection of the location information of the I picture corresponding to the time shift service request time point, and
        output plural TP packets from the time shift service request time point;
    a first and second storing units; and
    a time shift software module operatively connected to the MPEG decoder and the first and second storing units, the time shift software module configured to
        upon receipt of the signal, read the location information stored in the MPEG decoder,
        store location information of plural I pictures, including the location information of the I picture in the first storing unit in time orders from the time shift service request time point,
        store plural TP packets corresponding to the plural I pictures from the time shift service request time point in the second storing unit, and
        when a playback request signal including a playback start position is inputted, extract a set of the plural TP packets from the second storing unit based on the stored location information and the playback start position, interrupt the MPEG decoder, and output the set in an order corresponding to the playback request signal to the MPEG decoder for decoding.

2. The apparatus of claim 1, wherein each unit of location information includes a start location information and a finish location information of a corresponding I picture.

3. The apparatus of claim 1, wherein
    the playback request signal includes a playback direction and playback speed, the playback direction and the playback speed including one of a forward playback, a fast forward playback, a backward playback and a fast backward playback, and
    the time shift software module is configured to output the set to the MPEG decoder for decoding in accordance with the playback direction and the playback speed.

4. A speed change playback method of a digital television, comprising:

receiving and recording a stream of traffic:

decoding the recorded stream of traffic at a position different from a recording position;

receiving in a MPEG decoder a time shift service request including a time shift service request time point;

as a result of receiving the time shift service request, detecting and storing in the MPEG decoder location information of an I picture of a transport stream racket (TP packet), the location information corresponding to the time shift service request time point;

outputting by the MPEG decoder a signal notifying a detection of the location information of the I picture corresponding to the time shift service request time point;

outputting by the MPEG decoder plural TP packets from the time shift service request time point;

reading by a time shift software module the location information stored in the MPEG decoder;

storing by the time shift software module location information of plural I pictures, including the location information of the I picture in a first storing unit in time orders from the time shift service request time point;

storing by the time shift software module plural TP packets corresponding to the plural I pictures from the time shift service request time point in the second storing unit;

when a playback request signal including a playback start position is inputted, extracting by the time shift software module a set of the plural TP packets from the second storing unit based on the stored location information and the playback start position, and outputting the set in an order corresponding to the playback request signal to the MPEG decoder for decoding; and interrupting said step of decoding and decoding the set by the MPEG decoder.

5. The method of claim 4, wherein the playback request signal includes a playback direction and playback speed, the playback direction and the playback speed including one of a forward playback, a fast forward playback, a backward playback and a fast backward playback, the method further comprising:

outputting the set to the MPEG decoder for decoding in accordance with the playback direction and the playback speed.

6. The method of claim 4, wherein each unit of location information includes a start location information and a finish location information of a corresponding I picture.

* * * * *